(12) United States Patent
Barclay et al.

(10) Patent No.: US 10,330,524 B2
(45) Date of Patent: Jun. 25, 2019

(54) PREDICTIVE MONITORING SYSTEM AND METHOD

(71) Applicant: Inflight Warning Systems, Inc., Yorba Linda, CA (US)

(72) Inventors: Joseph Barclay, Yorba Linda, CA (US); Brian Kirby, Yorba Linda, CA (US)

(73) Assignee: Inflight Warning Systems, Inc., Yorba Linda, CA (US)

( * ) Notice: Subject to any disclaimer, the term of this patent is extended or adjusted under 35 U.S.C. 154(b) by 6 days.

(21) Appl. No.: 15/044,473

(22) Filed: Feb. 16, 2016

(65) Prior Publication Data

US 2017/0235620 A1    Aug. 17, 2017

(51) Int. Cl.
*G01H 3/00* (2006.01)

(52) U.S. Cl.
CPC ..................................... *G01H 3/00* (2013.01)

(58) Field of Classification Search
USPC ....................................................... 714/47.2
See application file for complete search history.

(56) References Cited

U.S. PATENT DOCUMENTS

| | | |
|---|---|---|
| 3,540,682 A | 11/1970 | Dibble |
| 3,647,196 A | 3/1972 | Cotton |
| 3,709,030 A | 1/1973 | Aselman |
| 3,825,212 A | 7/1974 | Darges et al. |
| 4,261,416 A | 4/1981 | Hamamoto |
| 4,282,870 A | 8/1981 | Porlier |
| 4,422,333 A | 12/1983 | Leon |
| 4,441,314 A | 4/1984 | Fitton |
| 4,751,848 A | 6/1988 | Miyamoto |
| 4,908,785 A * | 3/1990 | Cubbins .................. H04B 1/667 702/190 |
| 5,934,610 A * | 8/1999 | Karolys .................. G01H 1/003 244/1 R |
| 6,053,047 A * | 4/2000 | Dister .................. G01M 13/028 73/593 |
| 6,216,981 B1 | 4/2001 | Helm |

(Continued)

FOREIGN PATENT DOCUMENTS

| | | |
|---|---|---|
| EP | 1455313 | 9/2004 |
| WO | WO2013116139 | 8/2013 |

(Continued)

OTHER PUBLICATIONS

Zhang, Yu et al., "Applied Fault Detection and Diagnosis for Industrial Gas", http://eprints.lincoln.ac.uk/17324/1/IJAC.pdf, (May 6, 2015).

(Continued)

*Primary Examiner* — Amine Riad
(74) *Attorney, Agent, or Firm* — Tsircou Law, P.C.

(57) ABSTRACT

A system and method is disclosed which monitors factors in order to prevent impending component failure within a mechanical system, such as an aircraft. The monitoring system monitors the health and condition of system components, and utilizes proprietary algorithms to predict impending failures in monitored components before failure occurs. The system can shut down a component, send an alert, or adjust component thresholds as required.

6 Claims, 5 Drawing Sheets

(56) References Cited

U.S. PATENT DOCUMENTS

| | | | |
|---|---|---|---|
| 6,377,876 B1 | 4/2002 | Hedeen et al. | |
| 6,868,310 B2 | 3/2005 | Nasman et al. | |
| 6,883,754 B2 | 4/2005 | Ehrick | |
| 6,889,553 B2* | 5/2005 | Robinson | G01H 1/16 73/649 |
| 6,889,908 B2* | 5/2005 | Crippen | F24F 11/006 236/49.3 |
| 7,379,799 B2* | 5/2008 | Cleary | G06N 7/005 340/425.5 |
| 8,019,501 B2 | 9/2011 | Breed | |
| 8,022,843 B2 | 9/2011 | Mitchell et al. | |
| 8,027,267 B2* | 9/2011 | Denby | H04L 41/145 370/252 |
| 8,069,370 B1* | 11/2011 | Li | G06F 11/0709 714/26 |
| 8,156,377 B2* | 4/2012 | Li | G06F 11/0709 714/26 |
| 8,346,429 B2 | 1/2013 | Nwadiogbu et al. | |
| 8,437,904 B2 | 5/2013 | Mansouri et al. | |
| 8,442,778 B2 | 5/2013 | Bechhoefer et al. | |
| 8,666,569 B2* | 3/2014 | Goodrich | G07C 5/085 701/14 |
| 8,890,676 B1 | 11/2014 | Heath | |
| 8,972,067 B2 | 3/2015 | Holt et al. | |
| 2001/0039579 A1* | 11/2001 | Trcka | G06F 21/552 709/224 |
| 2003/0225492 A1* | 12/2003 | Cope | G07C 5/008 701/33.4 |
| 2006/0251507 A1* | 11/2006 | Braswell | F01D 5/027 415/13 |
| 2007/0239814 A1 | 10/2007 | Mathan et al. | |
| 2009/0265041 A1* | 10/2009 | Benjamin | G05B 9/02 700/292 |
| 2010/0063751 A1 | 3/2010 | Korolev | |
| 2012/0283963 A1 | 11/2012 | Mitchell et al. | |
| 2014/0163904 A1 | 6/2014 | Bechhoefer et al. | |
| 2014/0244051 A1 | 8/2014 | Rollins et al. | |
| 2014/0244567 A1 | 8/2014 | Babu et al. | |
| 2014/0266668 A1* | 9/2014 | Blankenship | G08B 13/1436 340/501 |
| 2015/0375870 A1 | 12/2015 | Poisson, Jr. et al. | |

FOREIGN PATENT DOCUMENTS

| | | |
|---|---|---|
| WO | WO2014123804 | 10/2014 |
| WO | WO2014/210583 | 12/2014 |

OTHER PUBLICATIONS

EPRI, "Program on Technology Innovation: Development of Algorithms for Anomaly Detection Based upon Dynamic Pressure Data Analysis", http://www.epri.com/abstracts/Pages/ProductAbstract.aspx?ProductId=000000000001015194, (Dec. 21, 2007).

Alsaleem, Fadi et al., "HVAC System Cloud Based Diagnostics Model", https://engineering.purdue.edu/HVACFDD/pdfs/Workshop_on_FDD_for_RTUs_Presentations/HVAC_Cloud-Based_Diagnostics-Alsaleem.pdf, (Jul. 14, 2014).

Saxena, Abhinav et al., "Fault Diagnosis in Rotating Mechanical Systems Using Self-Organizing Maps", http://www.researchgate.net/publication/254231194_FAULT_DIAGNOSIS_IN_ROTATING_MECHANICAL_SYSTEMS_USING_SELF-ORGANIZING_MAPS, (Jun. 11, 2014).

Canaday, Henry "Gathering aircraft systems data is often easier than analyzing and determining how to act on it", http://aviationweek.com/awin/new-predictive-mro-tools-cut-costs, (Feb. 11, 2013).

Sensory Prognostics and Management Systems (SPMS), p. 61, Jul. 11, 2011, Washington DC.†

Michael Ballas and Fred Potter, Solid State Power Control as a Network Backbone for Aircraft System Health Management, pp. 1-10, Oct. 22, 2012, Society of Automotive Engineers.†

Abhinav Saxena, Prognostics: The Science of Prediction, pp. 8, 26, 67, Oct. 10, 2010, Portland OR.†

\* cited by examiner
† cited by third party

PREDICTIVE MONITORING SYSTEM AND METHOD

FIELD OF THE INVENTION

The present invention relates generally to a predictive monitoring system and method, and, more particularly, to a predictive monitoring system and method to mitigate impending component failures.

BACKGROUND OF THE INVENTION

Predictive monitoring systems are implemented in a variety of applications such as vehicles and computers. Such systems may be used to predict any components in need of maintenance or subject to impending failure.

In many mechanical systems, monitoring vibration is the favored method of predictive monitoring. Although vibration is an inherent part of most mechanical systems, excessive vibration levels can indicate a problem. High vibration levels may indicate problems such as loose components, failing components, misaligned couplings, resonance and deformation, or mechanical or electromagnetic imbalance. Typically, vibration is monitored through the use of accelerometers permanently or magnetically mounted to system components. The level of vibration is typically measured as a function of frequency and amplitude. A vibration plot may also be visualized in three dimensions as a function of frequency, amplitude, and position. Further, the data may be analyzed via moving range analysis, wherein values are assessed over time. But, vibration data alone cannot accurately predict an impending failure, which is highly dependent on the normal operating conditions of a given system component.

If a component in a system fails, it can irreparably damage the component or even the system at large. Thus, if maintenance is performed, or the component is automatically disabled, further damage can be avoided. On the other hand, overly sensitive alert systems can lead to nuisance alerts. In a critical system component, unnecessary shutoff can be dangerous. Further, in a complex system, it may be impractical for an operator to disassemble a complex system to shut down a nonessential component.

Thus, what is needed is a predictive monitoring system that can accurately determine when intervention is required, select the appropriate intervention given the circumstances, and automatically act accordingly.

SUMMARY OF THE INVENTION

Briefly, and in general terms, the invention is embodied in a comprehensive monitoring and reporting system and method to prevent impending component failure within a mechanical system, such as an aircraft. The monitoring system monitors the health and condition of system components, to predict impending failures in monitored components before failure occurs.

More specifically, in an exemplary embodiment, the system measures characteristics of monitored components in real-time. The resulting data is analyzed for each selected component to a predict when data outputs are approaching the signature of a component nearing impending failure.

In a detailed aspect of an exemplary embodiment, specific components of the monitored system are deactivated if showing signs of impending failure.

In another detailed aspect of an exemplary embodiment, data recorders are mounted directly to the components that are part of the monitored system. Said data recorders sense prescribed characteristics of the monitored components, such as vibration frequencies, component temperatures, and/or fluctuations in electrical characteristics.

In another detailed aspect of an exemplary embodiment, the recorders transmit data back to a monitor via wired or wireless means. A monitor receives real time data from each of the data recorders and applies proprietary algorithms to determine whether the components within the monitored system are exhibiting pre-failure signatures. Pre-failure signatures are behaviors that predict precursors to impending component failure. The monitor will then either send an electronic notification or signal the data recorders to shut down the specific component in pre-failure mode.

In a preferred embodiment, algorithms are developed to monitor an airplane environmental control system, with vibration data as the prime factor. Other factors for developing the algorithm include, but are not limited to, multiple aircraft model installations, component installation position inside of the airplane, operating conditions, system configuration, whether operation is in the air or on the ground, etc.

In another detailed aspect of an exemplary embodiment, empirical data is generated to provide factorial inputs for both serviceable and non-serviceable components. These inputs are signatures of a component when it is functioning properly (serviceable) or not functioning properly (non-serviceable).

In another detailed aspect of an exemplary embodiment, a moving-range analysis is performed twice on every combination of factors, for both serviceable and non-serviceable versions of the components. This is used to evaluate "filters," which are ranges of frequencies evaluated over multiple factors. These filters are used to develop distribution plots. The distribution plots for each filter are then used to produce upper and lower control limits for the amplitudes of each filter. Z-scores are developed, and used to determine the consistent pre-failure condition path for the component as well as conditions describing system failures outside of the component. A filter is selected that has the highest Z-score. The filter with the highest Z-score has the highest probability of catching all unserviceable units and eliminating false positive indications.

In another detailed aspect of an exemplary embodiment, any external factors which affect the filters and/or Z-score during operation are compensated for using time delays or variables, shifts to filter during different modes of operation, and/or shifts to the upper control or lower control limits.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
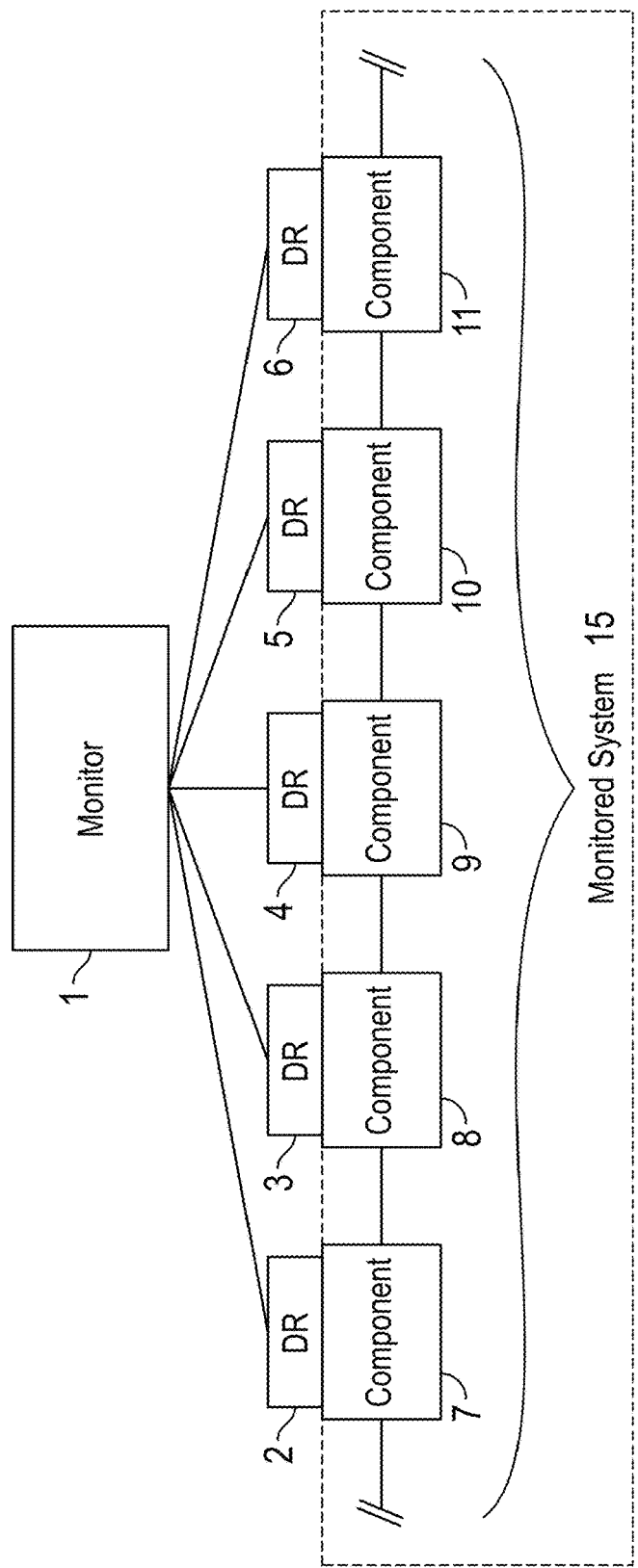
FIG. 1 is a simplified block diagram of a predictive monitoring system in accordance with the invention, depicting a monitor connected to data recorder devices.

Referring now to the drawings, and particularly FIG. 1, there is shown a predictive monitoring system 15, having a monitor device 1 connected to a plurality of data recorder devices 2-6. Said connection may be via wired or wireless means, and should permit two-way communications with the data recorders 2-6. The data recorders 2-6 are each attached to components 7-11 within the monitored system 15 in order to directly measure operating characteristics and transmit the data back to the monitor 1.

In an exemplary embodiment, the monitor 1 is powered by local electrical input. The monitor 1, either temporarily or permanently, may store raw data from each data recorder 2-6 in order to facilitate system diagnostics.

In this embodiment, the monitor 1 consists of computing hardware to process data and control other desired operations. For example, this hardware may include circuitry configured to process the data received from the data recorders 2-6, or to execute software or firmware programming instructions. Additionally, the monitor 1 in this embodiment has data storage capabilities from which information can be read, written, and executed. The monitor can include other hardware components capable of digitally communicating and interacting with the system, and other configurations which are capable of storing programming, data, or other digital information, whether co-located or distributed across a network, can be used without departing from the invention.

The data recorders 2-6 mount to components 7-11 that are part of the monitored system 15. Said data recorders 2-6 sense various characteristics of the monitored components 7-11 and transmit raw data back to the monitor 1 via wired or wireless means.

The data recorders 2-6 may take the form of a vibration data recorder to measure vibration frequencies, a temperature data recorder to measure component surface temperatures, an electrical data recorder to measure fluctuations in electrical characteristics, or any data recorder or combination of recorders suited to the system at hand. The data recorders 2-6 may be powered by local electrical input or by energy harvesting techniques.

Figure 2:
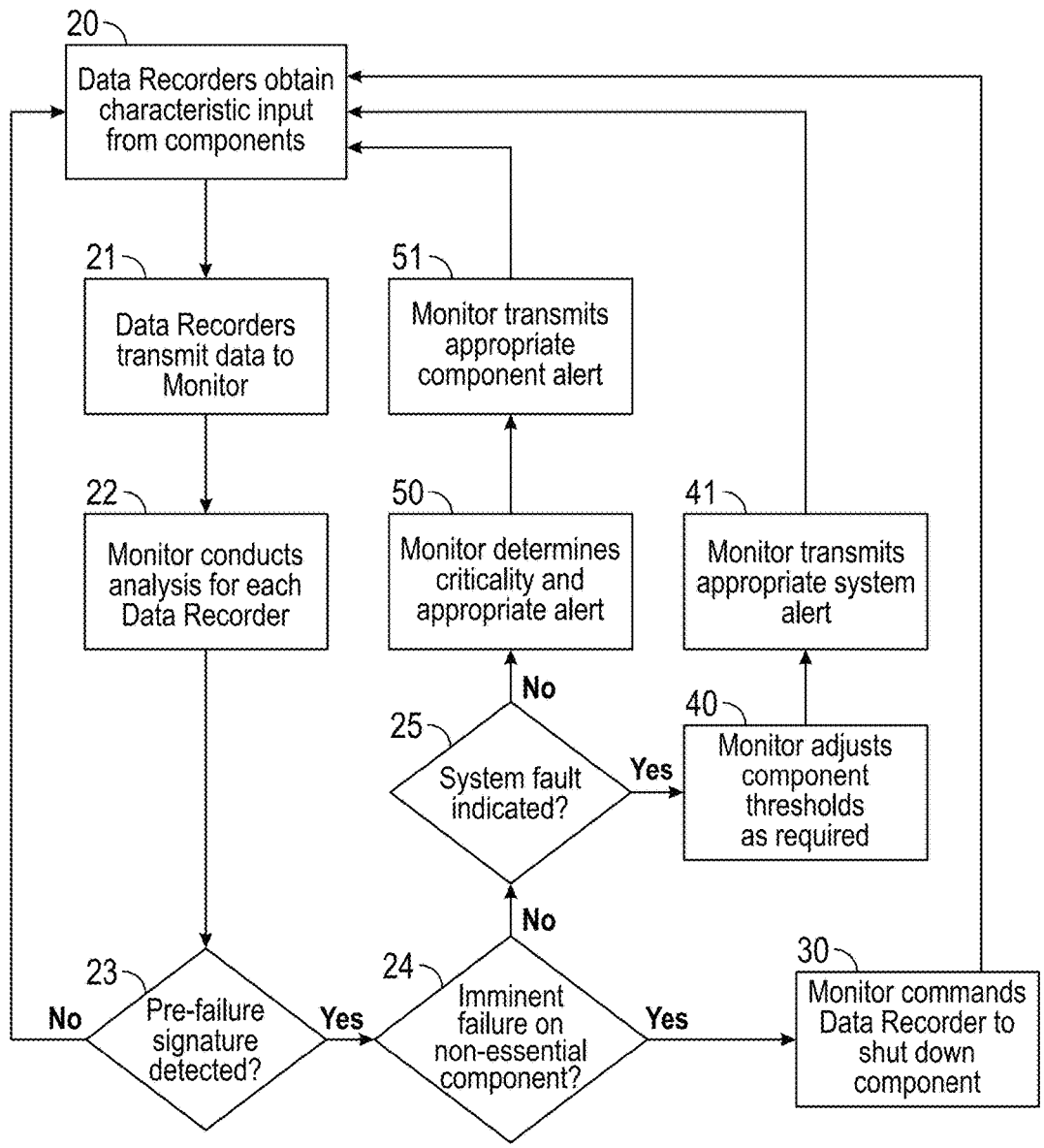
FIG. 2 is an exemplary flowchart of the system of FIG. 1.

FIG. 2 is a flowchart of a exemplary in-service process. The data recorders obtain characteristic input from components 20. The data recorders transmit data in real time to the monitor 21. The monitor applies proprietary algorithms to conduct analysis of the data from each data recorder 22. These algorithms permit the monitor to determine whether the components within the monitored system are exhibiting pre-failure signatures 23.

If a pre-failure signature is detected, there is a check to determine whether the pre-failure condition is created by one of the monitored components or by another factor within the system. If a pre-failure condition is detected, the system determines whether it is due to imminent failure of a non-essential component 24. If there is imminent failure of a non-essential component 24, the monitor commands the data recorder to shut down that component 30. The resulting component signal is then returned to the data recorder 20.

If there is not imminent failure of a non-essential component 24, the monitor determines if a system fault is indicated 25. In the event of system fault, the monitor adjusts the component thresholds as required 40 and transmits an appropriate system alert 41 if necessary. If there is not a system fault indicated 25, the monitor determines the criticality of the problem and issues the appropriate alert 50. The monitor then transmits the appropriate component alert 51. This may be an electronic notification, i.e., any combination of email, text message, message to a display panel, etc., regarding the component within the monitored system about to fail.

Figure 3:
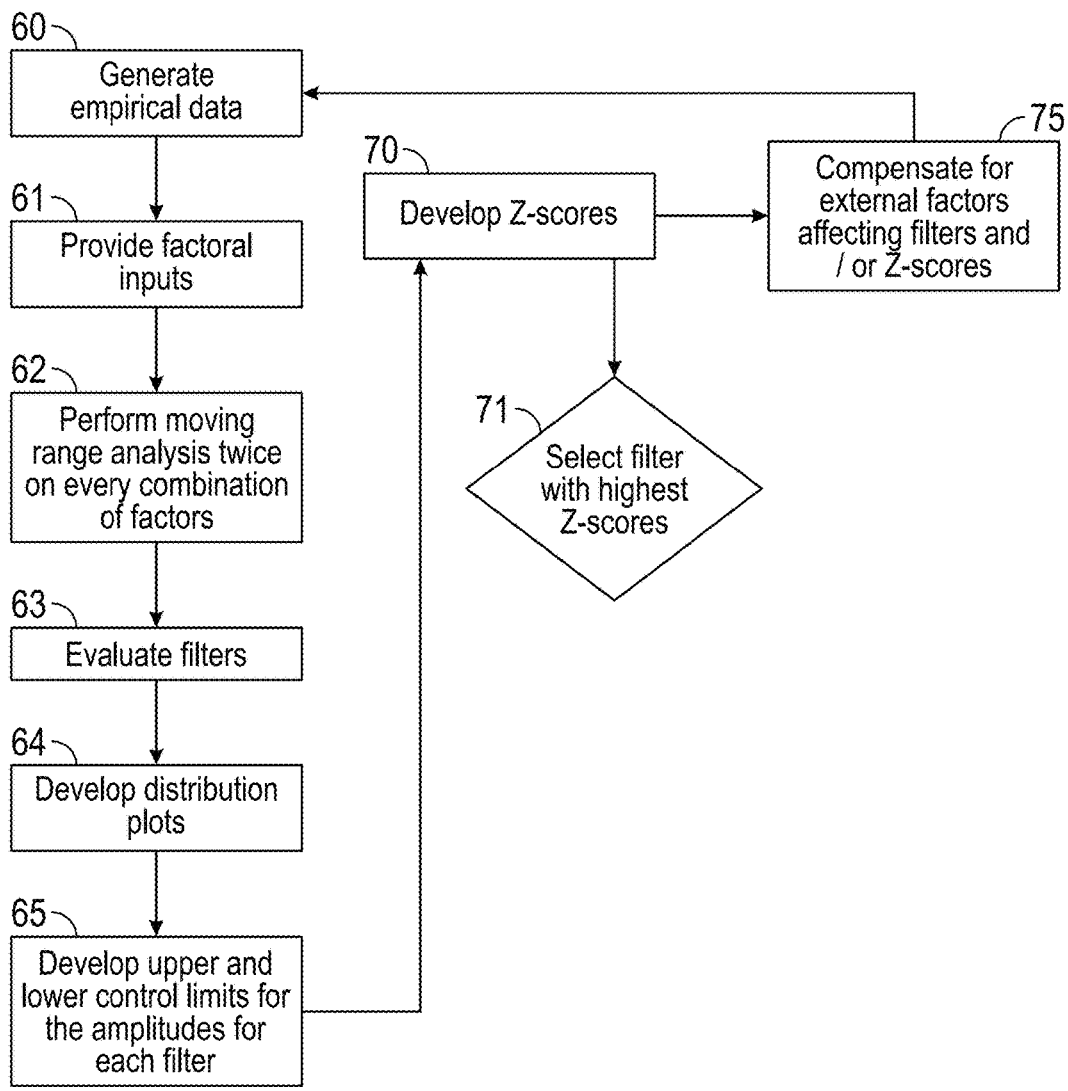
FIG. 3 is an overview flowchart of an exemplary algorithm of the monitor of the system of FIG. 1, to define pre-failure conditions.
Figure 4:
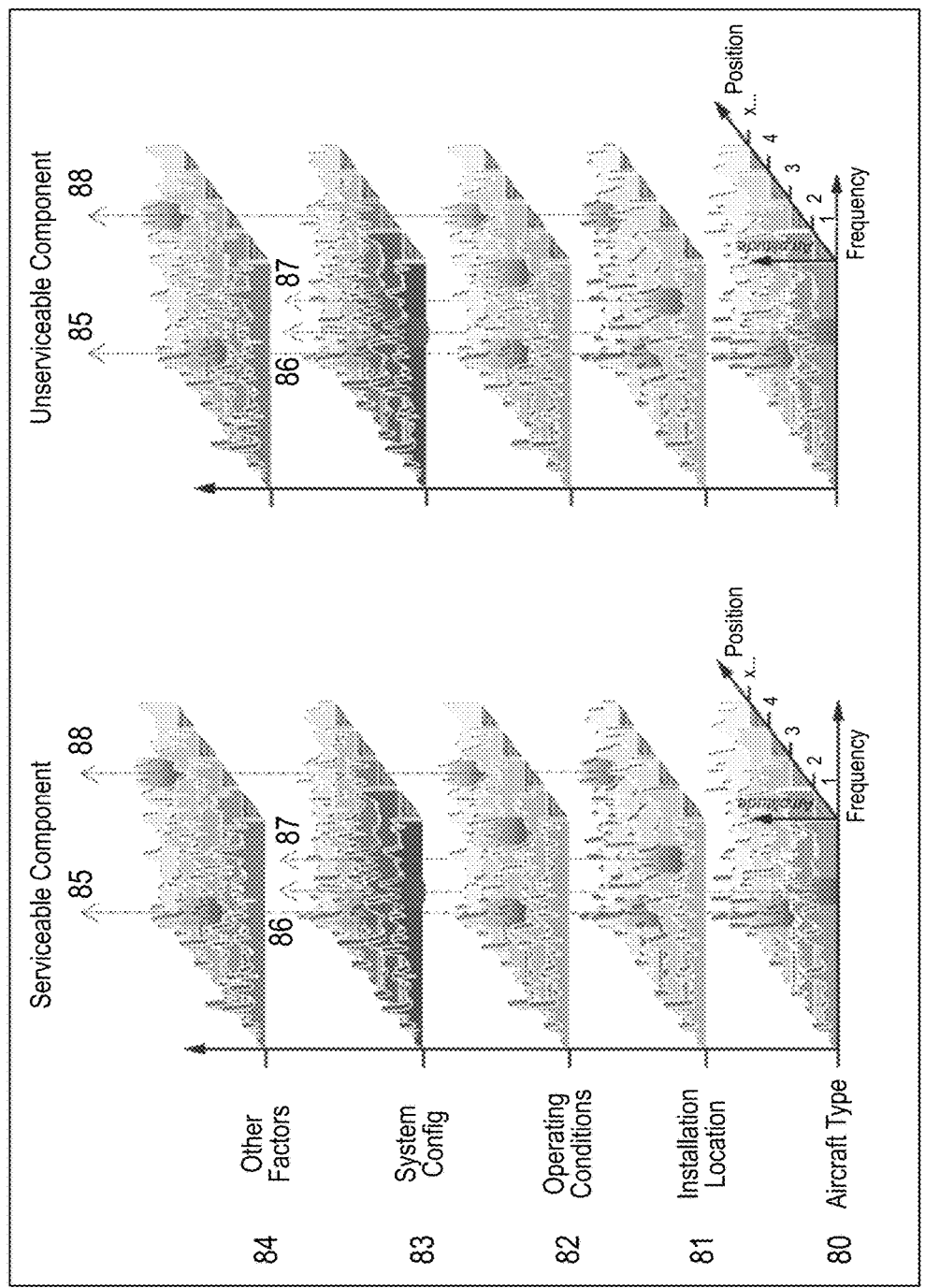
FIG. 4 is an exemplary evaluation of filters by factorial inputs, for use by the monitor of FIG. 1.

FIG. 3 is a flowchart of the algorithm to define pre-failure conditions. First, empirical data is generated 60. Factorial inputs are provided 61, for both serviceable and non-serviceable components. A moving range analysis is performed twice on every combination of factors, for both serviceable and non-serviceable components 62, 80-84 (FIG. 4). This information is used to evaluate filters 63, 85-88. Distribution plots are developed 64 (FIG. 4). The distribution plots for each filter are then used to produce upper and lower control limits for the amplitudes of each filter 65, 85-88.

Figure 5:
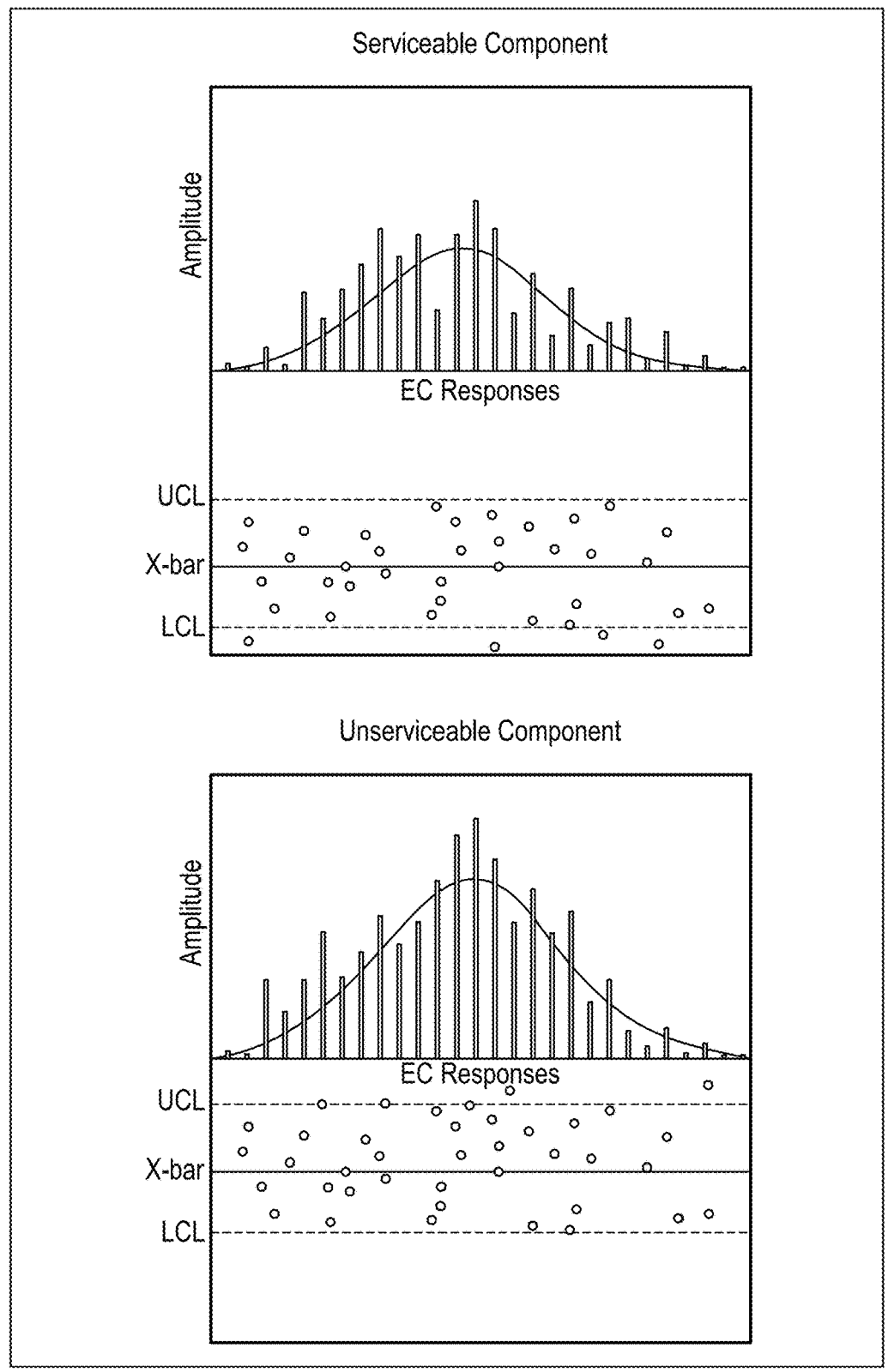
FIG. 5 is an exemplary evaluation of Z-scores for a filter used by the monitor of FIG. 1.

Z-scores are developed 70 to determine the consistent pre-failure condition path for the component, as well as other conditions that describe system failures outside of the component (FIG. 5). A filter is selected that has the highest Z-score 71. The filter with the highest Z-score is that with the highest probability of catching all unserviceable units and eliminating false positive indications. Any external factors which affect the filters and/or Z-score during operation are compensated for 75. This can be done through time variables or delays, shifts to filter during different modes of operation, shifts to the upper or lower control limits, etc.

FIG. 4 is an exemplary evaluation of filters 85-88 by factorial inputs. Multiple factors from the monitored system environment 80-84 are evaluated in order to develop useful and pertinent algorithms. In FIG. 4, a typical embodiment is provided the development of algorithms to monitor an airplane environmental control system, with vibration data as the prime factor. Aircraft type 80, installation location 81, operating conditions 82, system configuration 83, and other factors 84 are evaluated. Each filter 85-88 is a range of frequencies evaluated over several factors.

FIG. 5 is an exemplary evaluation of Z-scores for one filter. Z-scores are developed to determine the consistent pre-failure condition path for the component, as well as other conditions that describe system failures outside of the component. A filter is selected that has the highest Z-score 71.

It should be appreciated from the foregoing that the present invention provides a system and method for predicting imminent component failure using an algorithm that determines when imminent failure is likely, and comparing an impending failure curve to real-time data read from detectors connected to system components.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A system for monitoring a complex system, comprising:
 a plurality of data recorders joined to a plurality of monitored components within the monitored system, and said data recorders directly measure operating characteristics of the monitored components; and
 a monitor in digital communication with the plurality of data recorders, such that the monitor receives real-time data from said plurality of data recorders, the monitor includes computing hardware to process said data and to execute prescribed operations that include
  (a) determining pre-failure conditions for the plurality of monitored components within the monitored system, via
   (1) providing inputs pertaining to one or more factors of the monitored system, said inputs representing signatures of both serviceable and non-serviceable components,
   (2) performing a moving-range analysis on every combination of factors so as to generate one or more filters, wherein each filter represents a specific combination of factors and the associated range of the measured operating characteristics for a given component,
   (3) developing distribution plots for each filter,
   (4) developing a consistent pre-failure condition path for the component, and
   (5) selecting a filter from the one or more filters having the highest probability of catching all unserviceable units and eliminating false positive indications;
  (b) detecting a monitored component that is designated as a non-essential component and that satisfies one or more of said pre-failure conditions, such that the detected component is in imminent failure; and
  (c) sending a command to a respective data recorder to deactivate the corresponding detected component that is in imminent failure.

2. The system as defined in claim 1, wherein one monitor device is connected to a plurality of data recorder devices via wired or wireless means, so as to facilitate two-way communications with the data recorders.

3. The system as defined in claim 1, wherein the system is implemented to monitor systems on an airplane.

4. The system as defined in claim 1, wherein the monitor is powered by local electrical input.

5. The system as defined in claim 1, wherein the data recorders include one or more of the following: a vibration data recorder, a temperature data recorder, and an electrical data recorder.

6. The system as defined in claim 1, wherein Z-scores are developed to determine the consistent pre-failure condition path for the component, and the filter with the highest Z-score is selected.

* * * * *